May 25, 1965  M. D. MacARTHUR  3,185,502
LINED AND SEALED TUBING JOINT
Filed Dec. 26, 1961  2 Sheets-Sheet 1
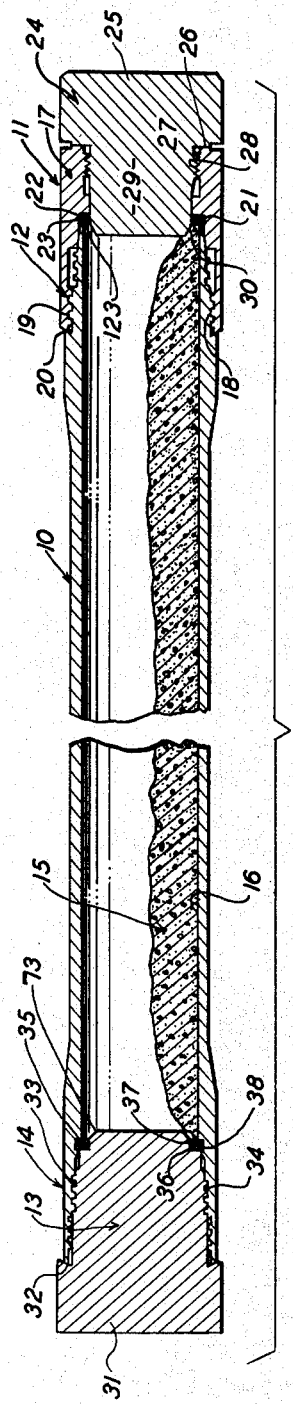
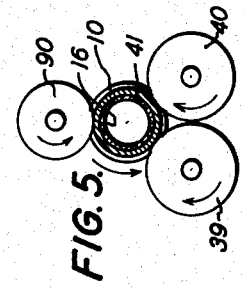
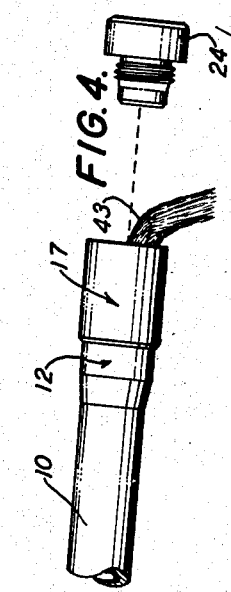
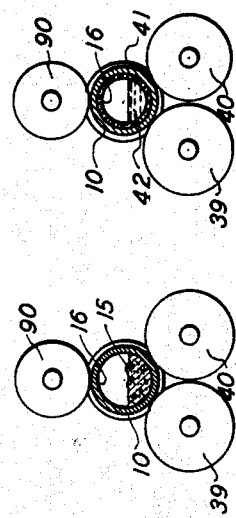
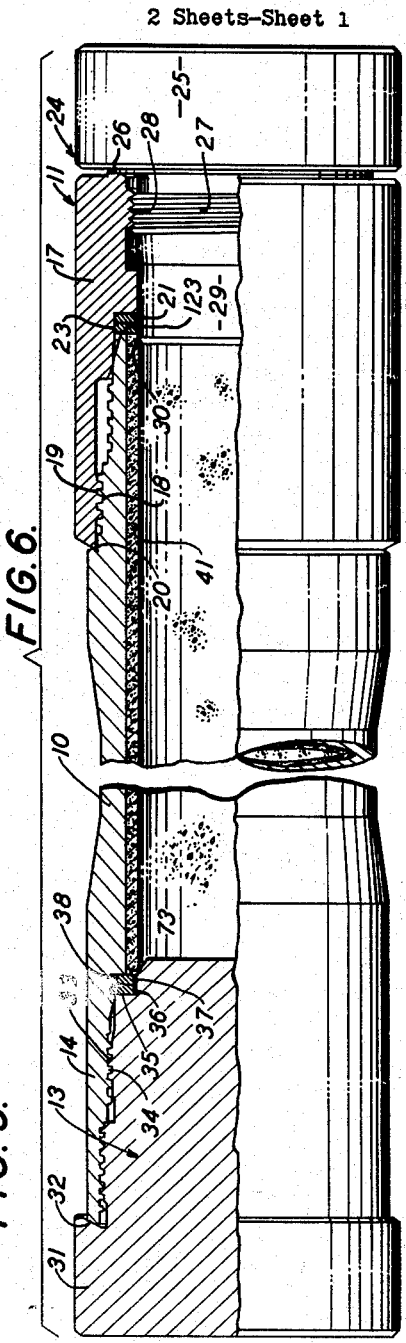
MELVIN D. MacARTHUR
INVENTOR.
BY *White and Haefliger*
ATTORNEYS

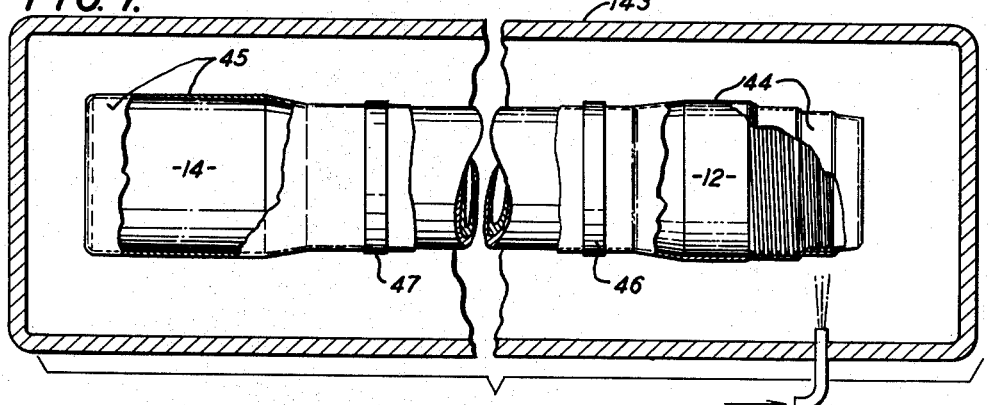
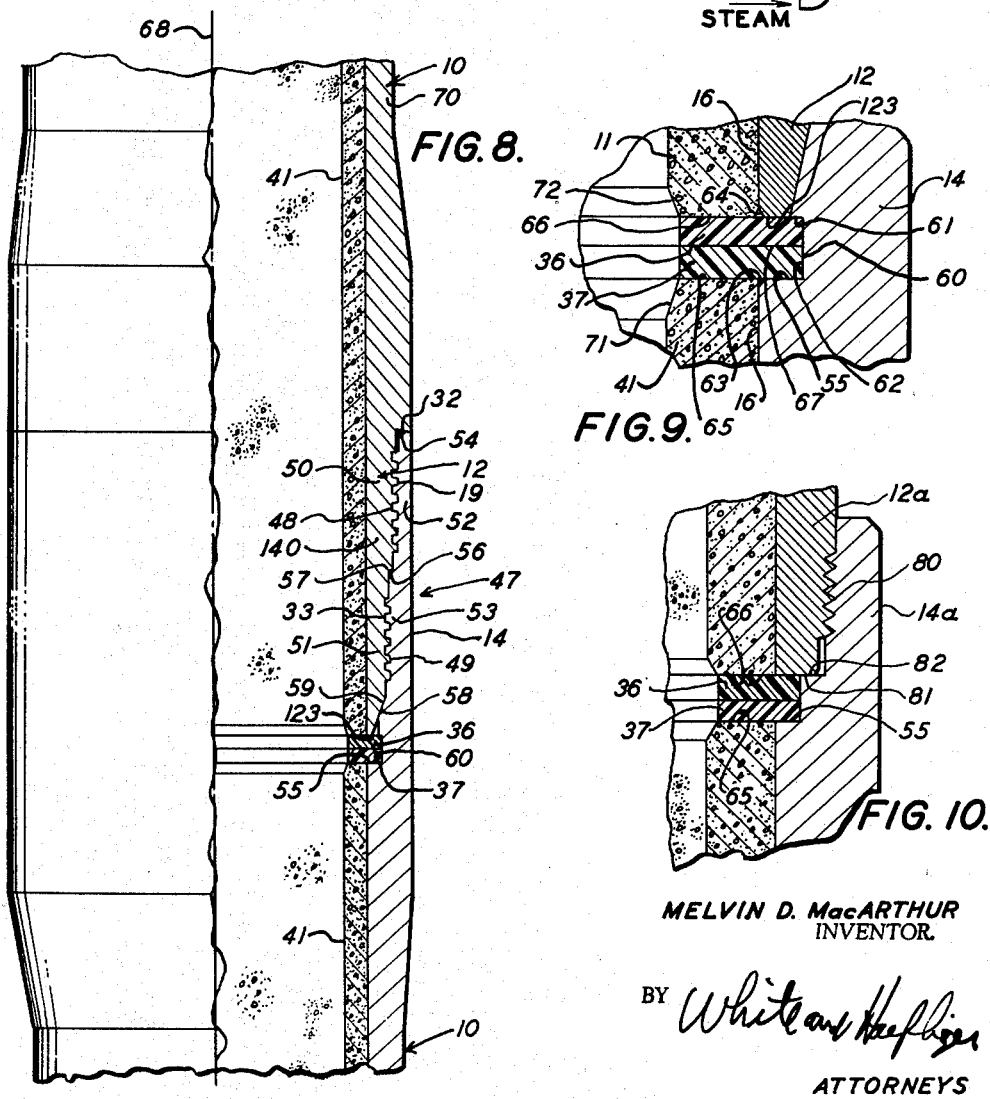
MELVIN D. MacARTHUR
INVENTOR.
BY Whitcar Hefliger
ATTORNEYS

3,185,502
LINED AND SEALED TUBING JOINT
Melvin D. MacArthur, Glendale, Calif., assignor to Hydril Company, Los Angeles, Calif., a corporation of Ohio
Filed Dec. 26, 1961, Ser. No. 161,970
5 Claims. (Cl. 285—55)

This invention relates generally to improvements in corrosion protection of oil well pipe, and more particularly concerns the lining and sealing of oil well tubing and joints between interconnected tubing pin and box members.

In corrosive oil or gas distillate wells, the problem of protecting the steel well tubing or pipe against the attack of corrosive production fluid is serious. Lengths of pipe are thread connected to permit pipe assembly and pipe string removal, and therefore the problem of protecting threaded joints in corrosive wells is related to and dependent upon the corrosion protection of the pipe bore between the joints. The types of pipe bore and joint protection against corrosion are basically classifiable in two forms. The first of these may be said to comprise a thin metallic or plastic coating applied on the pipe bore and also to the joint surfaces to accommodate gaskets spanning the coated surfaces at the joints. Such thin coatings have come into generally accepted use, but their cost is considered high and the protection afforded is somewhat uncertain because of inspection difficulties. Also, plastic coatings in most common use are quite frangible and therefore subject to formation of holidays at which corrosion by well fluid commences.

The second form of protection comprises a generally thick wall lining cast on the tubing bore, which affords successful protection of the main length of the pipe. However, difficulties are experienced at the joints because of inefficient gasketing of the space between the terminal ends of linings or successive pipe bores. In the past, such gasketing has usually taken the form of rubber bodies bonded or glued to the thick lining terminal, the bond comprising plastic cement and the joint being incapable of repeated make-up due to destruction of the bond upon unscrewing of the pin and box members. Accordingly, the use of a rubber gasket bonded to the thick lining terminals results in the forfeiting of satisfactory joint disassembly and joint interchangeability.

The purpose of the present invention is to provide lined and sealed tubing joint affording corrosion protection of the metallic pipe bore and joint surfaces and at the same time permitting satisfactory joint disassembly and interchangeability, all at reduced cost as compared with plastic lined or coated joints and tubing bores. With reference to the broader method aspects of the invention, the latter contemplates the rotation of well tubing to centrifugally cast spreadable and hardenable lining material over the tube bore, the material for example comprising an aqueous cement mortar or slurry. Preliminary to such lining formation, a ring is positioned adjacent the bore terminal so that the ring faces the annular end locus of the lining. Upon rotation of the tubing containing the lining material, the latter is urged into terminal contact with the ring and it is found that the combination hardenable lining cast against the ring affords a desirable and effective seal against corrosion due to the conformance of the lining to the ring in the first instance, the "casting" ring becoming the "field" ring in actual use of the joint.

More specifically as regards the casting technique, semi-rigid rings, as for example comprise sintered tetrafluoroethylene, are positioned at the bore terminals of each tubing length so that the ring ends face annular interior zones lining the tube bores. For example, the rings are positioned at the pin and box ends of the tubing and preferably an annular interior recess is formed adjacent the bore terminal at the box end of the tube to receive a pair of rings, and a like pair of rings is positioned at the pin end of the tubing. The pin and box ends of the tubing are capped typically by masking structure having screw threaded interengagement with the tubing facilitating tightening of the rings toward the bore terminals. Upon rotation of the tubing containing the aqueous mortar the solids content thereof packs against the bore and the ring member ends facing the lining, mortar water separating and collecting interiorly of the tubing. The water is then removed from the tubing and rotation of the latter is then completed to set the mortar solids in lining contact with the tube bore and terminal contact with the ring ends facing the lining. Upon curing it is found that the lining terminals have excellent conformance with the ring ends facing the lining, and lengths of tubing may be made-up to squeeze the rings between the terminals of the hardened abrasive cement linings to develop the desired absolute corrosion protection.

An important reason and purpose for providing two corrosion resistant and semi-rigid rings between the terminals of successive abrasive linings is to prevent abrasive wearing away of the rings during repeated make-up of the string sections. Thus, whereas one of the rings may become abrasively interlocked with the bore lining terminal at the box end of one tubing, and the other ring may become abrasively interlocked with the lining terminal at the pin end of the next tubing in the string, the two rings have slip face interengagement in a plane normal to the string axis so that upon relative rotation of the pin and box, the rings will slip relative to one another even when axially squeezed between the linings, and the rings will not slip relative to the lining terminals to which they are abrasively interlocked.

These and other objects and advantages of the invention, as well as the details of an illustrative embodiment will be more fully understood from the following detailed description of the drawings, in which:

FIG. 1 is a longitudinal elevation taken in section showing tubing length prepared for rotation to form the thick lining in contact with the tube bore and with rings at the bore terminals;

FIG. 2 is a section illustrating tubing rotation;

FIG. 3 is a view like FIG. 2 but showing tubing after initial rotation is completed;

FIG. 4 is a fragmentary side elevation showing removal of water from the tubing following initial rotation;

FIG. 5 is a view like FIG. 2 showing completion of tubing rotation;

FIG. 6 is a view like FIG. 1 illustrating capped tubing after formation of the completed lining;

FIG. 7 shows the step of curing the tubing lining;

FIG. 8 shows one form of fully made up joint which is corrosion protected in accordance with the invention;

FIG. 9 is an enlarged section showing the FIG. 8 joint details; and

FIG. 10 is a view like FIG. 9 but showing a modified joint.

Referring first to FIGS. 1 and 6, the tubing 10 is shown as having means 11 capping the pin end 12 thereof and means 13 capping the box end 14 thereof. In FIG. 1 the tubing is shown as being approximately half full of hardenable and spreadable lining material 15, the latter occupying the lower half of the tubing interior prior to rotation. In this connection, it will be understood that such material is introduced into the tubing prior to complete capping thereof, but after appropriate cleaning of the tubing as by degreasing, rinsing and pickling to prepare the surface of the tubing 16 for application of the lining.

The capping means 11 is shown to comprise a sleeve 17 interiorly threaded at 18 to screw on to the pin member thread 19 and engage the shoulder 20 of the pin member. In this position, a sleeve interior shoulder 21 exerts compressive force squeezing a pair of rings 22 and 23 between the shoulder 21 and the bore terminal 23 at the pin end of the tubing. The capping means 11 also includes a plug member 24 which is flanged at 25 to engage the end of the sleeve at 26 upon screwing of the plug of the plug thread 27 into the sleeve interior thread 28. The plug member includes an axial projection 29 extending through the rings 22 and 23 while fitting the internal diameter of the rings. The projection has a frusto-conical taper 30 adapted to come into peripheral contact with the lining proximate the ring during tubing rotation, thereby to form an internal bevel at the terminal end of the lining as will become clear.

The capping means 13 comprises a plug member which is flanged at 31 to engage the stop shoulder 32 of the box member when the capping member is threaded into the box member. For the latter purpose the plug member has external thread 33 engaging the box member interior thread 34. In the configuration shown in FIG. 1, the plug member has a shoulder 35 which exerts loading axially to compress a pair of rings 36 and 37 between the shoulder 35 and the bore terminal 38 in the tubing.

The tubing 10 is shown in FIG. 2 as centered for rotation and straightening, typically by rolls 39, 40 and 90. Other structure may be provided for maintaining the tubing straight during rotation and for rotating the rolls but the invention is not concerned therewith. It will be understood that the aqueous mortar or slurry deposited in the tubing may be suitably introduced through the sleeve member 17 after the plug member 24 has been removed therefrom. Typically, the aqueous mortar may comprise water and a dry mix containing Portland cement and silica flour. A dry mix composition which has been used comprises around 40 percent Portland cement, 40 percent volcanic ash and 20 percent silica flour, and enough water mixed therewith to develop the mortar or slurry.

Upon rotation of the rolls 39 and 40, the mortar is centrifugally cast into lining contact with the tube bore 16 and into terminal contact with the end faces of the rings 37 and 23, the latter facing the annular end loci of the lining which is indicated at 41 in FIG. 3 and also in FIG. 6. Such casting is accompanied by packing of the solids content of the mortar into intimate conformance with the bore and the end faces of the said rings. At the same time, the excess water content of the mortar tends to separate from the solids content due to the centrifugal action, and the water collects interiorly of the tubing as indicated at 42 in FIG. 3, which shows the tubing after initial rotation thereof. FIG. 4 shows the manner in which excess water may then be removed from the tubing in accordance with the invention, as by removal of the plug member 24 from the sleeve 17 and tilting of the tubing to pour the excess water at 43 from the tubing interior and over the end rings 22 and 23 which remain in place. Thereafter, tubing rotation may be completed as shown in FIG. 5 to set the mortar solids in lining contact with the tube bore and terminal contact with the rings 23 and 37. A final phase of treatment of the formed lining includes curing thereof under conditions of steam heating typically within a chamber 43 as shown in FIG. 7. For this purpose, the capping means 11 and 13 may first be removed from opposite ends of the tubing for re-use in connection with the forming of linings within like sections of tubing. Rings 22, 23, 36 and 37 are normally left in place during curing. Typically, plastic sacks or covers 44 and 45 are applied over the pin and box ends of the tubing and clamped in place at 46 and 47 to prevent escape of moisture from within the tubing during the cure, and for holding ring 23 in place on the pin for lining support during cure.

After the curing operation, the ring 23 at the pin end of the tubing is stripped away leaving the lining terminal free at the pin end for contact with the ring 36 of a corresponding tubing as shown in FIG. 8 and also in FIG. 9. In those views the joint 47 is shown to include pin member 12 and the box member 14 having interengaged threads 19 and 48 in one step, and interengaged threads 49 and 33 in a second step. The coupled-together pin and box members are of the two-step type with the pin threads 19 and 49 being cut on steps 140 and 51 respectively, these threads having the same pitch and outline characteristics. Likewise, box member threads 48 and 33 are complementary to pin threads 19 and 49, and are cut on steps 52 and 53. At the outer end of the box member, the stop shoulder 32 is complementary to and opposed to pin stop shoulder 54, while at the inner end of the box there is a square cut shoulder 55 axially spaced from and facing the square cut pin shoulder 123. When the joint is fully made-up, pin and box square cut shoulders 56 and 57 are also in interengagement limiting such make-up, and the forwardly tapered pin and box stop shoulders 58 and 59 are in compressive engagement near the forward end of the pin. Shoulders 32 and 54 are engaged along a frusto-conical locus having approximately 30 degree angularity to a plane normal to the joint axis. The same relationship is true as respects the interengagement of the plug member 31 with the box member 14 at 32 in FIGS. 1 and 6.

The box member has an annular recess 60 opening inwardly and extending about the space adjacent the terminal end of the pin member in FIG. 8 and in FIG. 9. This recess is formed by the bore terminal shoulder 55 of the box member, another box member shoulder 61 extending radially, and the annular recess wall 62. Both the box and pin members have rather shallow bevels or chamfers 63 and 64 intersecting the box and pin bores 16 and also intersecting the box shoulder 55 and pin forward shoulder 123.

The spacing of the shoulders 55 and 123 is such as to accommodate the reception of the rings 36 and 37 therebetween, the rings being annularly continuous and held compressed between the shoulders 55 and 123, and also between the terminals 65 and 66 of the pin and box linings 41. The two rings 36 and 37 have slip face interengagement at the location 67 in a plane normal to the axis of the pin and box members, that axis being shown at 68 in FIG. 8.

It is a feature of the invention that the semi-rigid plastic rings 36 and 37 may become mechanically or abrasively interlocked with the terminals 65 and 66 of the lining such as during formation of the lining as described and during make-up of the joint, ring 36 becoming locked to lining terminal 66 and ring 37 becoming locked to lining terminal 65. Due to the provision of two rings, there is relative slippage occurring at the slip face 67 during field use of the joint, rather than at the interface between the rings and the lining terminals. In this connection, the engagement of the stop shoulders 32 and 54 is such as to pressurize the abrasive interlocking of the lining terminals and rings without preventing rotary slipping at the face 67, and at the same time to squeeze the rings to establish an effective seal. Therefore, the otherwise probably rapid wearing away of the sealing rings by abrasive chewing engagement with the abrasive lining is obviated. Typically, the rings 36 and 37 may comprise tetrafluoroethylene which is semi-rigid, corrosion resistant, tough and yet has a relatively low coefficient of sliding friction. Other materials having these properties may also be used.

As is clear from FIG. 9, corrosive fluid within the pipe or tubing is prevented from contacting the metallic joint surfaces due to the effective sealing extent of the rings 36 and 37 with each other and with the linings 41. For this purpose, the rings are squeezed between the lining end terminals 65 and 66 after make-up of the joint, and the rings have radial dimensions which overlap not only the shoulders 55 and 123 but also the major extents of the coating or lining terminals 65 and 66. The axial thickness of each ring 36 and 37 is substantially less than the radial dimension thereof, and the thickness of the lining 41 preferably is about the same as the nominal thickness of the pipe or tubing wall at 70 in FIG. 8, this pipe wall thickness being that which is found throughout the major length of the tubing.

As also previously brought out, lining interior bevels are formed at 71 and 72, typically by the corresponding bevels 30 and 73 of the plug members 25 and 31, so as to prevent destructive chipping of sharp edges of the linings by tools lowered through the string.

The joint shown in FIG. 10 includes many of the elements of the FIG. 9 joint, which are similarly numbered. Differences include the threading at 80 of the modified pin member 12a into the modified box member 14a with the terminal 81 of the pin bottoming against the box stop shoulder 82, under which conditions the rings 36 and 37 are squeezed between the cement lining terminals 65 and 66, and between the box recess wall 55 and the pin terminal 81.

I claim:

1. An oil well pipe string joint comprising coaxial pin and box members respectively including external and internal threads, said pin member being screwed longitudinally forwardly into the box member to interengage said threads for holding the pipes against separation, said pin member having at its forward terminal a forwardly facing annular shoulder, said box member having an annular shoulder facing rearwardly toward said pin shoulder but spaced forwardly thereof, corrosion resistant abrasive material coating said pin and box member bores proximate said shoulders, and means including a pair of annularly continuous rings of corrosion resistant material compressed between said shoulders, one ring contacting the pin shoulder and the other ring contacting the box shoulder, said rings being relatively rotatable in response to screwing and unscrewing of the pin member in the box member, the box member forming an annular recess opening inwardly to be bounded by said pin and box member shoulders, both rings being retained in said recess against dislodgment therefrom upon unscrewing of the pin member and the abrasive coating thereon to separate from said one ring, and said means and coating material forming a corrosion resistant barrier preventing corrosive fluid access to said threads.

2. The invention as defined in claim 1 in which said rings comprise plastic substance abrasively interlocked with said coatings.

3. The invention as defined in claim 2 in which said coating material comprises abrasive cement.

4. The invention as defined in claim 1 in which said rings have slip face interengagement in a plane normal to said member axis.

5. The invention as defined in claim 4 in which said rings are axially compressed between the terminal faces of said coatings on said members, the thickness of said coating approximating the pipe wall thickness along the major length of the pipe.

References Cited by the Examiner

UNITED STATES PATENTS

| 798,441 | 8/05 | Nelson | 285—332.2 |
| 997,351 | 7/11 | Williams | 285—355 |
| 2,340,537 | 2/44 | Keener | 285—55 |
| 2,532,632 | 12/50 | MacArthur | 285—55 |
| 2,553,340 | 5/51 | Smith | 285—355 |
| 2,557,544 | 6/51 | Kennison. | |
| 2,719,348 | 10/55 | Desnos. | |
| 2,805,872 | 9/57 | Routh | 285—55 |
| 2,889,733 | 6/59 | Vanderhoof | 285—220 |
| 3,054,628 | 9/62 | Hardy | 285—333 |

FOREIGN PATENTS

| 479,616 | 4/53 | Italy. |

CARL W. TOMLIN, *Primary Examiner.*